United States Patent [19]

Mizuno

[11] Patent Number: 4,836,525
[45] Date of Patent: Jun. 6, 1989

[54] AUTOMATIC ORIGINAL FEEDING AND DISCHARGING UNIT

[75] Inventor: Masayuki Mizuno, Osaka, Japan

[73] Assignee: Mita Industrial Co., Ltd., Osaka, Japan

[21] Appl. No.: 195,846

[22] Filed: May 19, 1988

[30] Foreign Application Priority Data

May 20, 1987 [JP] Japan ............................ 62-123246
Sep. 17, 1987 [JP] Japan ............................ 62-233520

[51] Int. Cl.$^4$ ............................................. B65H 5/00
[52] U.S. Cl. ................................. 271/3; 271/186; 355/309
[58] Field of Search .............. 355/3 SH, 14 SH, 23, 355/24, 26; 271/3.1, 186, 3

[56] References Cited

U.S. PATENT DOCUMENTS

| | | | |
|---|---|---|---|
| 4,428,666 | 1/1984 | Phelps et al. | 355/14 SH |
| 4,699,365 | 10/1987 | Smith et al. | 355/3 SH |
| 4,744,553 | 5/1988 | Hirose | 271/186 X |
| 4,761,001 | 8/1988 | Hayakawa | 271/186 X |
| 4,769,674 | 9/1988 | Kitajima | 355/3 SH |

*Primary Examiner*—R. L. Moses
*Attorney, Agent, or Firm*—Beveridge, DeGrandi & Weilacher

[57] ABSTRACT

An automatic original feeding and discharging unit comprising a feeding roller which contacts to an original fed on an original table of a copying machine and transfers said original in a prescribed direction, a discharge roller which contacts to the original on the original table and transfers said original in a direction counter to the transferring direction of said feed roller, a selecting means which selectively contacts either said feed roller or discharge roller to the original on the original table, a positioning member which is possible to project from the upper surface of the original table so as to contact to the front edge in the transferring direction of the original transferred by said discharge roller, and to plunge in from the upper surface of the original table so as to enable the original transferred by said discharge roller to pass thereabove, a driving means which drives said positioning member to project and plunge from the original table, and a reversing means which reverses the upper and underside of the original passing above the positioning member and feeds it on the original table.

The automatic original feeding and discharging unit is possible to feed each side of an original surely at a prescribed position on an original table successively readily with a simple construction.

31 Claims, 10 Drawing Sheets

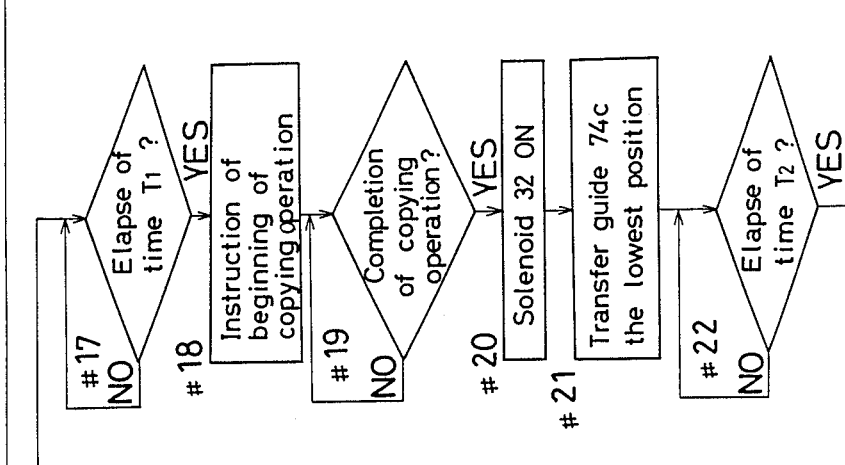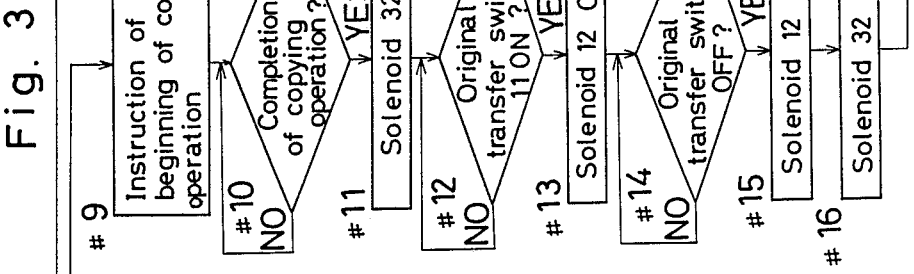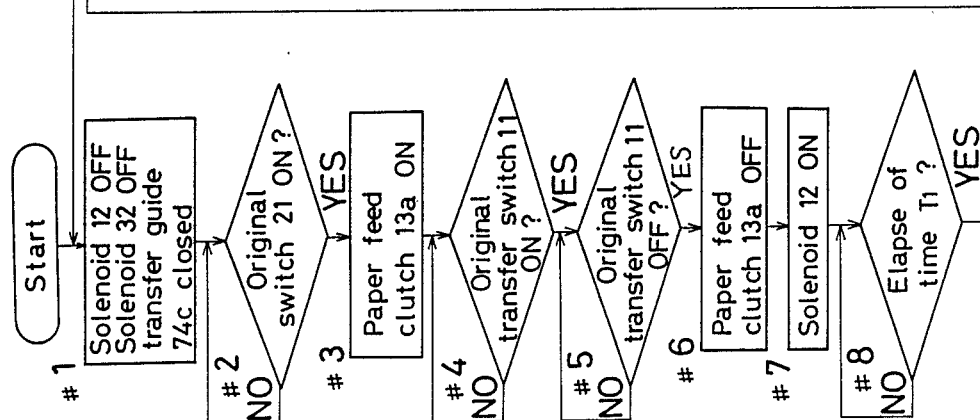
Fig. 3

AUTOMATIC ORIGINAL FEEDING AND DISCHARGING UNIT

BACKGROUND OF THE INVENTION

1. Field of the Invention

The present invention relates to an automatic original feeding and discharging unit, more specifically, it relates to an automatic original feeding and discharging unit which is, when copying an original with an image forming apparatus such as an electrophotographic copying machine, capable of feeding the original on an original table of said copying machine so as to be placed at a prescribed position thereon, and discharging said original from the original table when the copying operation is completed.

2. Description of the Prior Art

In a copying machine such as an electrophotographic copying machine, an original to be copied is placed on an original table using a contact glass or the like to form a copy image of the original by an electrophotographic process. In such copying machine, when a plurality of originals are copied, an automatic original feeding and discharging unit which feeds the originals to be copied successively on the original table and discharges the originals which have bee copied successively from the original table is used.

In the conventional automatic original feeding and discharging unit, after the original is transferred to a prescribed position on the original table by a transfer belt extending from one side to the other side above the original table, the transfer belt is stopped temporarily for positioning the original. After the original has been copied, the transfer belt is driven again to discharge the original from the original table. In the conventional automatic original feeding and discharging unit thus constructed, due to the expansion and contraction of transfer belt or the difference of friction coefficient on the surface thereof the original can not be stopped surely at the prescribed position in a prescribed attitude, so that the original is apt to shift from its prescribed position on the original table. When the original to be transferred is not placed properly on the original table before transfer, it is transferred as it is, thus also in this case the original is apt to be placed improperly on the original table. Since the original is transferred by the transfer belt only in the fixed direction, when a large size original of, for example, A2 size is to be fed or discharged to and from the original table, the transfer belt must be enlarged.

In order to solve such problem, an automatic original feeding and discharging unit which feeds and discharges the original to and from the original table by rollers without using the transfer belt is disclosed in Japanese Patent Publication No. 41825/1974.

In the automatic original feeding and discharging unit disclosed in Japanese Patent Publication No. 41825/1974, the original is positioned at the prescribed position on the original table in such a manner that, the original is first fed to the original table by the transfer roller and when the original arrives at the prescribed position on the original table, said transfer roller is detached from the original to stop transferring the original. Therefore, in order to stop the original in the prescribed attitude at the prescribed position on the original table, timing or the like for detaching the original transfer roller from the original must be controlled very precisely. Since the friction coefficient between the original and the original table is not always constant, the original detached from the original transfer roller at the prescribed timing does not always stop at the prescribed position on the original table, but likely to shift therefrom due to the paper quality of the original. Moreover, the original is transferred to the original table in parallel movement and its attitude is not corrected on the original table, so that if it is not in the prescribed attitude in the beginning it will never be placed on the original table in the prescribed attitude. It is thus very difficult to place the original surely in the prescribed attitude at the prescribed position on the original table by the automatic original feeding and discharging unit disclosed in Japanese Patent Publication No. 41825/1974. In addition, the original having original faces on both sides can not be placed so as to bring the original face in contact with the original table successively.

Another prior art is disclosed in U.S. Pat. No. 4,428,666. In this U.S. Patent, a registration edge which is possible to project and plunge is provided so as to position the original at the prescribed position on the original table. A reversing mechanism is also provided for copying the original having two original faces. In this prior art, however, a pair of rollers which contact to the original on the original table for transfer are designed to transfer only in one direction, so that when one side of the original has been copied the original is once discharged and returned to the original stocker and fed once again after one side of remaining originals have been copied. At this time, the original is directed to the reversing mechanism and after being oriented by a diverter on the way, transferred reversely in the opposite direction to the original table for copying operation of the other side, thus a very long transferring path is required for copying both sides, which is not only time consuming but also the unit itself become complex and it is difficult to make it compact.

SUMMARY OF THE INVENTION

It is, therefore, an object of the present invention to provide an automatic original feeding and discharging unit which is possible to feed each side of an original having two original faces surely at a prescribed position on an original table successively readily with a simple construction.

In order to achieve the aforesaid object, in one preferable construction of the present invention, the automatic original feeding and discharging unit comprises, a feed roller which contacts to the original fed to the original table of a copying machine and transfers said original in a prescribed direction, a discharge roller which contacts to the original on the original table and transfers said original in a direction opposite to the transferring direction of the feed roller, a selecting means which selectively contacts either the feed roller or discharge roller to the original on the original table, a positioning member which is possible to project from the upper surface of the original table so as to contact to the edge in the transferring direction of the original transferred by the discharge roller, and to plunge in from the upper surface of the original table so as to pass the original transferred by the discharge roller thereabove, a drive means for driving the positioning member to project from and plunge into the original table, and a reversing means which reverses the upper side and underside of the original passing above the positioning member to feed on the original table. In the aforesaid construction, the. positioning member and reversing member may be substituted by a following original guide member, which is disposed on the side of the original table on the discharge side of the discharge roller, and including an original reversing surface which reverses the upper side and underside of the original transferred by the discharge roller to guide to the original table, and a positioning surface which is possible to contact the front edge of the original transferred by the discharge roller. In this case, the drive motor is to be substituted by means which selectively switches the original guide member such that either the original reversing surface or positioning surface in the original guide member is functioned.

As another preferable construction, the automatic original feeding and discharging unit may comprise, a feed roller which contacts to the original fed to the original table of a copying machine and transfers said original in a prescribed direction, a discharge roller which contacts to the original on the original table and transfers said original in a direction opposite to the transferring direction of the feed roller, a selecting means which selectively contacts either the feed roller or discharge roller to the original on the original table, a positioning member which is possible to project from the upper surface of the original table so as to contact to the edge of the transferring direction of the original transferred by the discharge roller, and to plunge in from the upper surface of the original table so as to pass the original transferred by the discharge roller thereabove, a reversing means which receives the original discharged from the original table by the discharge roller, reversing it and guiding to the side of original table, a switching means arranged on the way through which the original discharged from the reversing means is guided to the original table, and a control means for controlling the selecting means in such that the feed roller is contacted to the original after a first prescribed time after the front original edge has operated the switching means, and the discharge roller is contacted to the original within a second prescribed time after the rear original edge has detached from the switching means.

According to the present invention thus constructed, since the original is contacted to the positioning member or the positioning surface in the original guide member by the discharge roller, the original is positioned surely in the prescribed state on the original table. In addition, the original is fed and discharged only in the vicinity of one side of the original table, so that even the large original can be placed on the original table without problem irrespective of the compact size. Furthermore, in the automatic original feeding and discharging unit of the present invention, since the original transferred from the original table is reversed and returned thereto, and moreover discharged therefrom by utilizing the reversing mechanism or the reversing surface of the original guide member, the construction is simplified and copy images of the original having original faces on the both sides can be readily formed. It is also possible to form the copy image of the original having the original face only on one side easily. In both cases, after completing the copying operation the originals can be paginated in order.

When a switch which is operated by the original fed reversely is disposed to control operations of the feed roller and discharge roller relative to the original respectively after a prescribed time from the variation of the switch, the operation timing of each roller can be controlled without detecting the size for all original sizes, thus a control system can be simplified.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which:

FIG. 3 is a flow chart showing the operation of the control system.

DETAILED DESCRIPTION OF THE PREFERRED EMBODIMENT

Figure 1:
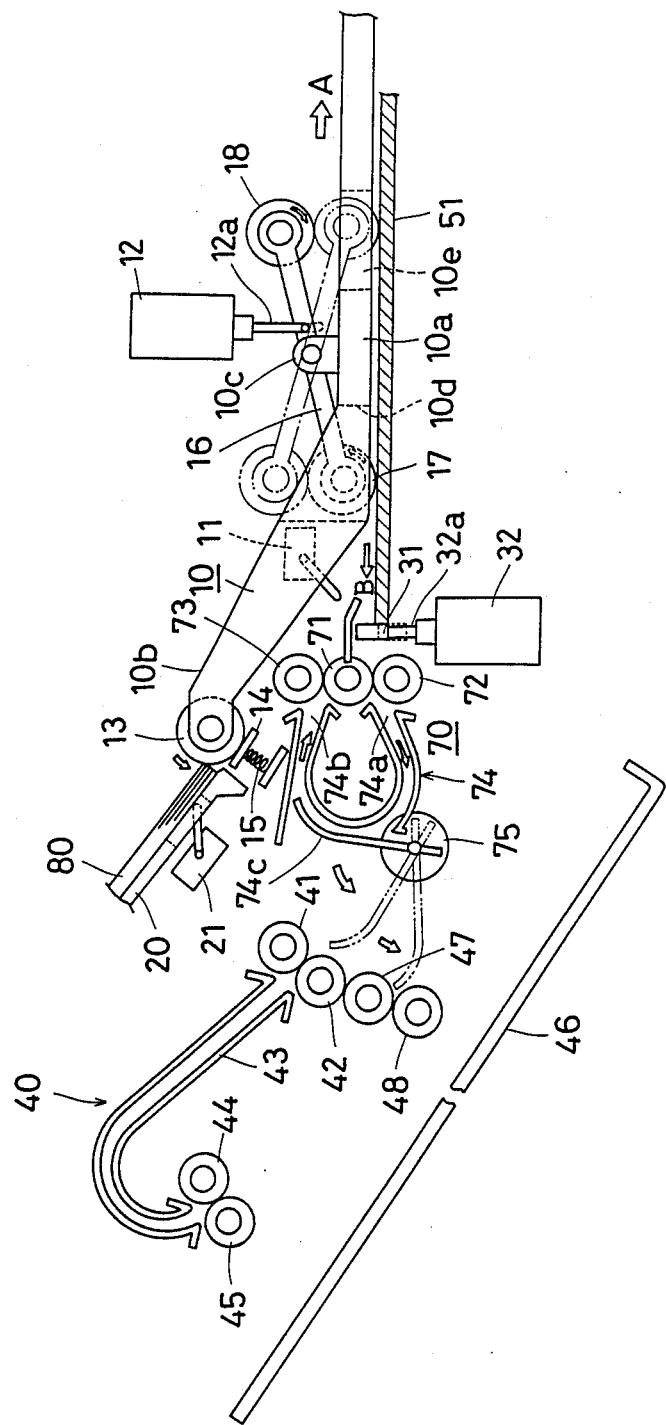
FIG. 1 is a schematic view showing one embodiment of an automatic original feeding and discharging unit of the present invention.

As shown in FIG. 1, an automatic original feeding and discharging unit includes a paper feed guide 10 disposed above an original table 51 in an electrophotographic copying machine body, and an original paper feed table 20 disposed on the side of the original table 51.

The original paper feed table 20 is located above the original table 51 in the copying machine body and inclined toward the original table 51. On the original paper feed table 20, originals 80 to be copied are placed in order from the bottom as facing its original face downward. On the original paper feed table 20, an original switch 21 for detecting the presence of original is provided.

The paper feed guide 10 disposed above the original table 51 in the copying machine body includes a support 10a arranged substantially horizontally with a gap between the upper surface of original table 51 through which the original can be passed, and a guide 10b extending outward from the side of the support 10a on the disposed side of the original paper feed table 20 to the original paper feed table 20.

On the end of the guide 10b, a paper feed roller 13 is disposed so as to contact to the edge of the original 80 placed on the original paper feed table 20. To the paper feed roller 13, a friction member 14 is pressed by means of a coil spring 15, thereby a plurality of originals 80 placed on the original paper feed table 20 are prevented from being transferred multiply, but transferred one by one from the top successively to the original table 51. The original transferred by the paper feed roller 13 is guided to the guide 10b in the paper feed guide 10 and fed to the original table 51. On the guide 10b, an original transfer switch 11 which is switched on by contacting to the original transferred along the guide 10b is disposed. The paper feed roller 13 is coupled to a prescribed drive source through a paper feed clutch and rotated when the paper feed clutch is in an ON condition (power transmission).

Substantially in the center on the upper surface of the support 10a in the paper feed guide 10, a mounting member 10c is projected to support the center portion of a support lever 16 extending in the feeding direction of the original pivotally. On one end of the support lever 16 on the disposed side of the original paper feed table 20, a feed roller 17 is disposed rotatably and on the other end thereof a discharge roller 18 is disposed rotatably. The feed roller 17 and discharge roller 18 are moved respectively downward by the rotation of the support lever 16 in rolling contact with the upper surface of the original table 51 through holes 10d and 10e opened in the support 10a in the paper feed guide 10. The feed roller 17 is rotated in the same direction (counter clockwise in FIG. 1) as the paper feed roller 13 arranged on the end of guide 10b in the paper feed guide 10, contacting to the original transferred and fed on the original table 51 by the paper feed roller 13 to transfer it in the direction indicated by an arrow A in FIG. 1, and guiding into a gap between the original table 51 and the support 10a in the paper feed guide 10. The discharge roller 18 is rotated in the opposite direction (clockwise in FIG. 1) of the rotating direction of the feed roller 17, transferring the original transferred on the original table 51 in the opposite direction (discharging direction indicated by an arrow B in FIG. 1) of the transferring direction of the feed roller 17. A sponge roller or the like having a comparatively lower friction coefficient is used as the discharge roller 18. The feed roller 17 and discharge roller 18 are coupled to a prescribed drive source and rotated continuously when the automatic original feeding and discharging unit is operated.

To the support lever 16 to which the feed roller 17 and discharge roller 18 are mounted, for example, at the position on the disposed side of the discharge roller 18 from the pivotal point, the end of a plunger 12a of a solenoid 12 disposed thereabove is connected. The solenoid 12 is designed to contact either the feed roller 17 or discharge roller 18 selectively to the original on the original table 51, whereby when the solenoid 12 is ON, the plunger 12a is moved downward to rotate the support lever 16 so as to move the discharge roller 18 downward. Conversely, when the solenoid 12 is OFF, the plunger 12a is moved upward to rotate the support lever 16 so as to move the feed roller 17 downward.

On the side of transferring direction of the original by the discharge roller 18 on the original table 51, a positioning member 31 of the original is disposed. The positioning member 31 is disposed along the side edge of original table 51 and, for example, mounted to the top of a plunger 32a of a solenoid 32 disposed under the original table 51. The positioning member 31 is projected from the upper surface of the original table 51 when the solenoid 32 is in OFF condition, and when the solenoid 32 is ON the plunger 32a is moved downward and the positioning member 31 is plunged below the upper surface of the original table 51. The original fed on the original table 51 by the feed roller 17 is transferred by the discharge roller 18 in the discharging direction indicated by the arrow B to contact to the positioning member 31 projecting above the upper surface of the original table 51 at its front edge in the transferring direction, and positioned in the prescribed condition along the positioning member 31. In this case, since there is a gap of about the thickness of original formed between the original table 51 and the guide of the paper feed guide 10, the original is not corrugated, thus positioning can be effected easily. When copying of the original is finished, the positioning member 31 plunges in from the upper surface of the original table 51, and the original on the original table 51 is discharged therefrom by the discharge roller 18 as passing over the positioning member 31.

On the side of positioning member 31 on the discharging side of the original, a reversing mechanism 70 is provided. In the reversing mechanism 70, a pair of upper and lower intermediate rollers 71, 72 contacting each other are disposed, and above the upper intermediate roller 71 a paper refeed roller 73 is disposed for contact. On the side of intermediate rollers 71, 72 and paper refeed roller 73, an intermediate reversing path 74 is provided. The intermediate reversing path 74 is curved in a circular arc as such that an inlet port 74a is opposed to the contact between the intermediate rollers 71, 72, and an outlet port 74b is opposed to the contact between the upper intermediate roller 71 and the paper refeed roller 73. An external periphery of the circular arc forms a transfer guide 74c, through which the original discharged from the original table 51 by the intermediate rollers 71, 72 and introduced into the inlet port 74a, is guided upward and discharged from the outlet port 74b as its upper side and underside being reversed. The original discharged from the outlet port 74b is transferred again toward the original table 51 by the upper intermediate roller 71 and paper refeed roller 73. The original transferred toward the original table 51 by the upper intermediate roller 71 and paper refeed roller 73 is guided to the guide 10b in the paper feed guide 10, and after contacting the original transfer switch 11 again to switch it on, arrives at the original table 51.

On the side of reversing mechanism 70, a second original reversing mechanism 40 is further disposed. The second reversing mechanism 40 includes a pair inlet guide rollers 41, 42, an original reversing path 43 and a pair of outlet guide rollers 44, 45. The inlet guide rollers 41, 42 introduce the original discharged from the original table 51 by the discharge roller 18 into the original reversing path 43. The original reversing path 43 is opposed to the inlet guide rollers 41, 42 at its upstream side end and tilted upward as going downstream. The downstream portion is curved in a circular arc by approximately 180° and its extreme end is opposed to a pair of outlet guide rollers 44, 45. Under the original reversing path 43, there is provided an original discharge tray (hereafter referred to "original tray") 46 onto which the original transferred through the original reversing path 43 is discharged as its upper side and underside being reversed.

On the side of reversing mechanism 70, a pair of discharge rollers 47, 48 are further disposed.

The transfer guide 74c in the intermediate reversing path 74 of the reversing mechanism 70 is pivotable and can be set in three setting positions comprising, a substantially vertical condition in which the intermediate reversing path 74 is closed to guide the original introduced thereinto upward so as to be reversed and discharged from the outlet port 74b, a condition in which it is pivoted downward from the substantially vertical condition to approach the inlet guide rollers 41, 42 in the original reversing mechanism 40 at its end, and a condition in which it is further pivoted downward from the second condition to approach the discharge rollers 47, 48. The transfer guide 74c is coupled to, for example, a pulse motor 75, through which it is pivoted and set in either of the three positions aforementioned.

Figure 2:
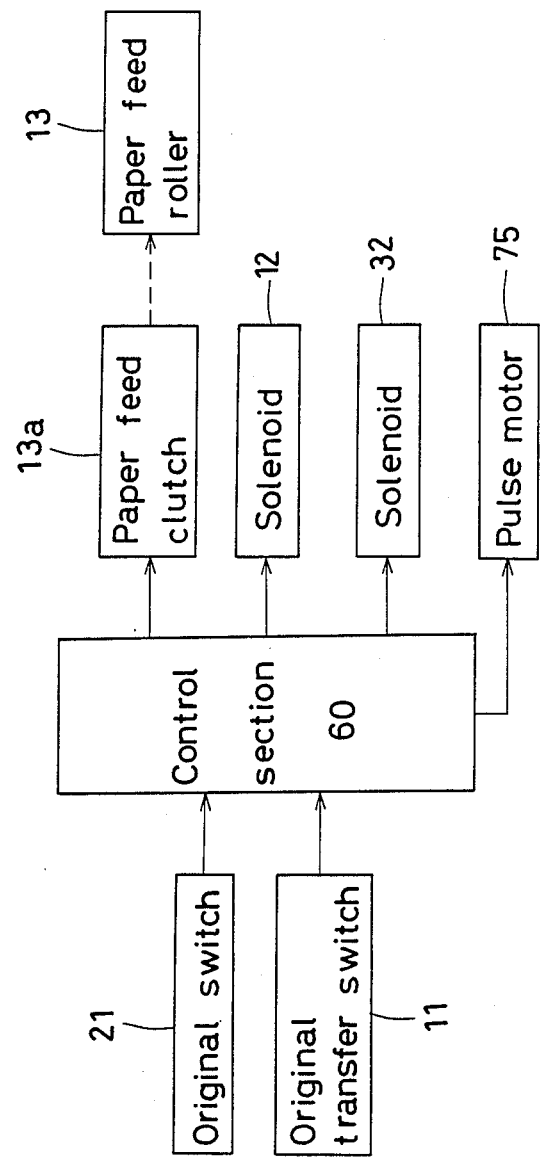
FIG. 2 is a block diagram of a control system of the unit of FIG. 1.

FIG. 2 is a block diagram of a control system of the automatic original feeding and discharging unit of the present embodiment. In the figure, numeral 60 denotes a control section using, for example, a microcomputer, to which outputs of the original switch 21 provided on the original paper feed table 20 and the original transfer switch 11 disposed in the guide 10b of the paper feed guide 10 are inputted. On the other hand, the output of the control section 60 is given to the paper feed clutch 13a which connects the prescribed drive source and the paper feed roller 13 to rotate the paper feed roller 13, the solenoid 12 for rocking the support lever 16 onto which the feed roller 17 and discharge roller 18 are mounted, the solenoid 32 which projects the positioning member 31 from the upper surface of the original table 51 and plunges the same therefrom, and the pulse motor 75 which moves the transfer guide 74c in the rotating direction. The control section 60 also outputs the signal which instructs a control section of the copying machine to start copying operation, and the signal instructing the completion of copying operation is inputted from the control section of the copying machine Operation of the automatic original feeding and discharging unit thus constructed, thereby the original having original faces on both sides thereof is discharged from the original table 51 after being fed to the original table 51 and copied by the copying machine, will be described with reference to a flow chart shown in FIG. 3. In this case, the copying machine is capable of copying on both sides of a recording paper.

First, the originals are placed on the original paper feed table 20 in order from the bottom. When the switch instructing the copying operation is actuated in this condition, the solenoids 12 and 32 are OFF and the pulse motor 75 is driven to close the transfer guide 74c in the intermediate reversing path 74 so as to guide the original introduced into the intermediate reversing path 74 out from the outlet port 74b (refer to step #1 in FIG. 3, the rest is same). When the originals are placed on the original paper feed table 20 and the original switch 21 is ON (Step #2), the paper feed clutch 13a is in ON condition (Step #3), the original on the top of the original paper feed table 20 is fed to the original table 51 by the paper feed roller 13 and transferred on the original table 51 by the feed roller 17. At this time, after being switched ON temporarily (Step #4) the original transfer switch 11 becomes OFF (Step #5), switching off the paper feed clutch 13a (Step #6) and switching on the solenoid 12 (Step #7) to transfer the original in the opposite direction by the discharge roller 18. After a prescribed time T₁ has elapsed (Step #8), the front edge of the original in the transferring direction by the discharge roller 18 is contacted to the positioning member 31 and the discharge roller 18 keeps the original contacting the positioning member 31. In such condition, beginning of the copying operation is instructed (Step #9) and the copying machine conducts the prescribed copying operation. When the copying operation is completed (Step #10), the solenoid 32 is put on (Step #11) to plunge in the positioning member 31 from the upper surface of the original table 51, and the original is introduced into the intermediate reversing path 74 by the intermediate rollers 71 and 72.

Since the intermediate reversing path 74 is closed by the substantially vertical transfer guide 74c, the original introduced thereinto is transferred along the transfer guide 74c and discharged from the outlet port 74b of the intermediate reversing path 74. The original is fed to the original table 51 along the guide 10b in the paper feed guide 10 as its upper side and underside being reversed by the paper refeed roller 73 and the upper intermediate roller 71. At this time, the original contacts to the original transfer switch 11 to switch it on (Step #12). By switching on the original transfer switch 11, the solenoid 12 is OFF (Step #13) and the feed roller 17 is in rolling contact with the original table 51, transferring the original arrived thereon.

When the rear end of the original in the transferring direction detaches from the original transfer switch 11 to switch it off (Step #14), the solenoid 12 is ON (Step #15) to contact the discharge roller 18 to the original, at the same time the solenoid 32 is OFF (Step #16) to project the positioning member 31 upward from the original table 51. When the original is transferred in the discharging direction by the discharge roller 18 and a prescribed time $T_1$ has elapsed (Step #17) in such condition, the front end of original in the transferring direction is in contact with the positioning member 31. In the condition where the original is continuously contacted to the positioning member 31 by the discharge roller 18, the signal instructing the beginning of copying operation is outputted to the copying machine (Step #18) to start the prescribed copying operation.

When the prescribed copying operation is completed (Step #19) the solenoid 32 is ON (Step #20), the positioning member 31 is plunged in from the upper surface of the original table 51 and the pulse motor 75 is driven to bring the transfer guide 74c in the intermediate reversing path 74 to the lowest position close to the discharge rollers 47 and 48 (Step #21). Thereby the original on the original table 51 is discharged therefrom by the discharge roller 18 onto the original tray 46 as being guided to the transfer guide 74c by the intermediate rollers 71 and 72.

By repeating such operations successively, both original faces of the original o the original paper feed table 20 are copied from the small paged number and placed successively on the original tray 46. The originals piled on the original tray 46 are in order from the top. When copying the original having the original face only on one side by using such automatic original feeding and discharging unit, it is operated in such a condition that the end of the transfer guide 74c in the intermediate reversing path 74 is brought to the position close to the inlet guide rollers 41, 42 in the second original reversing mechanism 40 by the pulse motor 75. In this case, the original provided to the second reversing mechanism 40 side through the transfer guide 74c of the reversing mechanism 70 is introduced into the original reversing path 43 by the inlet guide rollers 41 and 42. The original introduced into the original reversing path 43 is passed therethrough and discharged on the original tray 46 by the outlet guide rollers 44 and 45 as its original face being faced upward.

Figure 4:
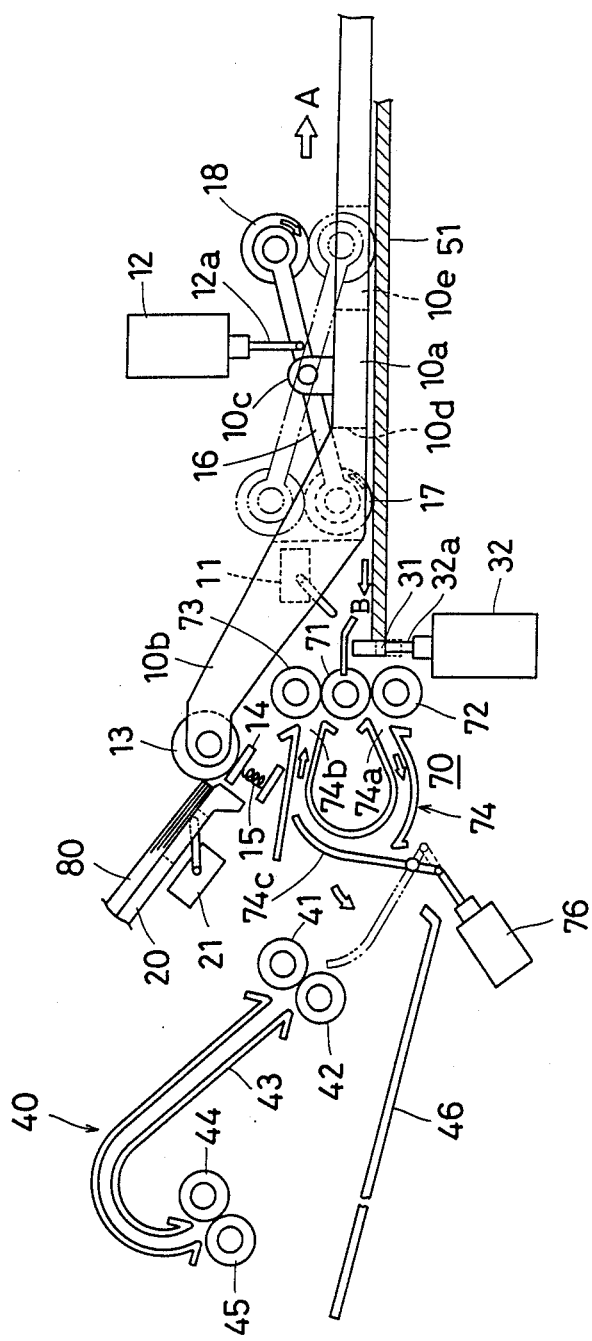
FIG. 4 is a schematic view showing the present embodiment in which the unit of FIG. 1 is partly modified.

In addition, when the copying machine is capable to copy only on one side of the recording paper, for example, as shown in FIG. 4, the automatic original feeding and discharging unit having the transfer guide 74c in the intermediate reversing path 74 which takes two settling positions comprising, a position whereby the intermediate reversing path 74 is closed and the original introduced from the inlet port 74a is guided to the outlet port 74b, and a position where it is pivoted downward from the first position to approach the inlet guide rollers 41, 42 in the second original reversing mechanism 40 at its end is used. I this case, in order to pivot the transfer guide 74c a solenoid 76 may be used without using the pulse motor 75 as the aforesaid embodiment.

In FIG. 4, the originals are placed on the original paper feed table 20 in order from the bottom. Thus, the originals placed on the original paper feed table 20 are paged 1 on the side contacting the table and 2 on the upper side thereof, 3 on the underside of the original placed on the first original and 4 on the upper side thereof.

In such condition, after feeding the top original on the original table 51 the original is introduced into the intermediate reversing path 74 where the transfer guide 74c is substantially in the upright position, reversed without conducting copying operation by the copying machine and fed on the original table 51 in the reversed condition. Thereby, the original face having the largest page number is contacted to the original table 51. Then, as same as the embodiment aforementioned, the original is placed in the prescribed position on the original table 51, operating the copying machine for the prescribed copying operation. Thus, the original face having the largest page number is copied. Next, the original is reversed again in the intermediate reversing path 74 and fed to the original table 51 for copying the reverse side (page number is smaller by 1) of the original face which has been copied already. After the copying, the transfer guide 74c in the intermediate reversing path 74 is pivoted downward by the solenoid 76, and the original on the original table 51 is guided to the transfer guide 74c, introduced into the second original reversing mechanism 40 to be reversed thereby and placed on the original tray 46.

By repeating such operations successively, the original face having the largest page number is copied first and the copied papers are placed on the copy receiving tray of the copying machine in order from the top. On the other hand, on the original tray 46, the originals are placed to have the largest page number on the bottom side so as to be set in order from the top.

Figure 5:
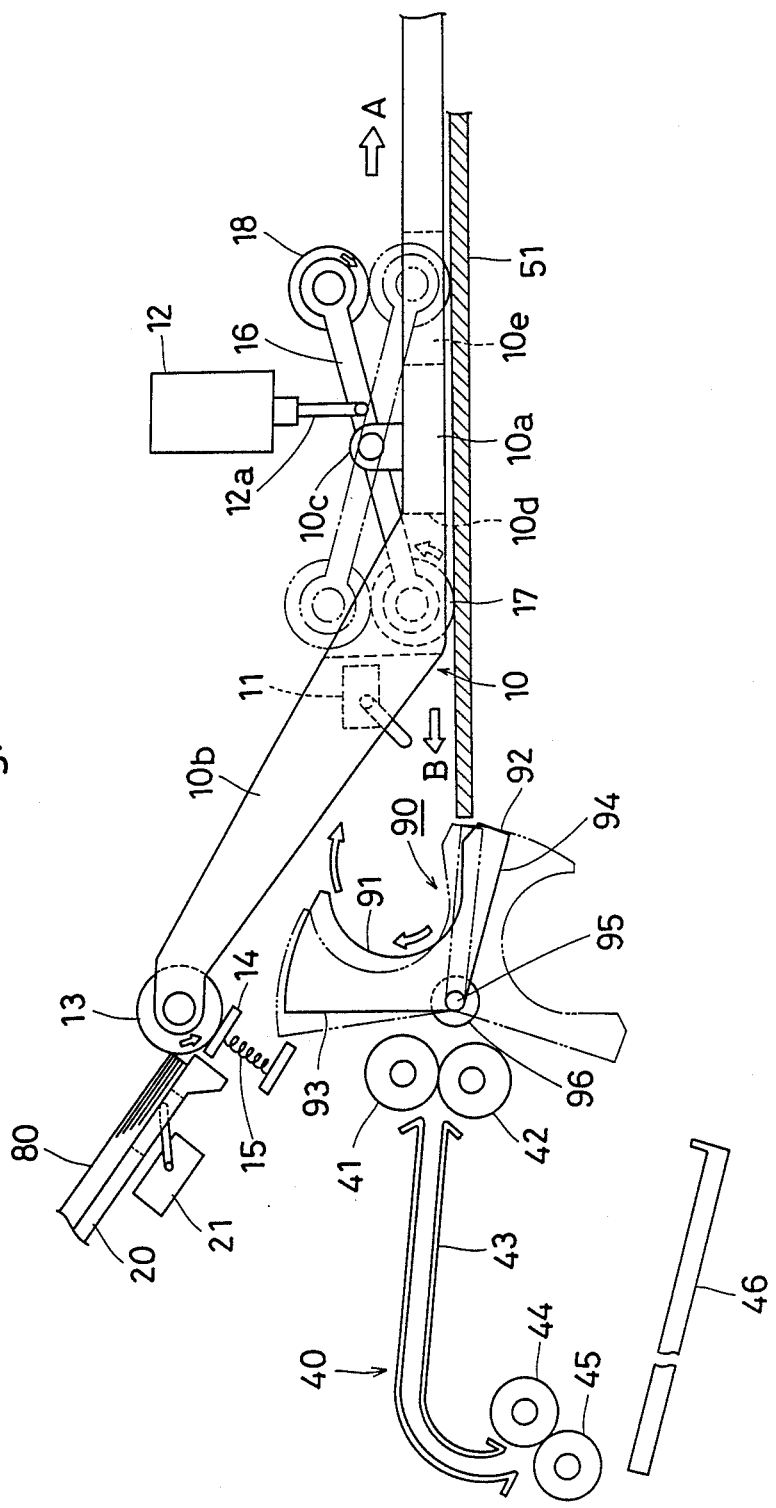
FIG. 5 is a schematic view showing another embodiment of an automatic original feeding and discharging unit of the present invention.

The embodiment of FIG. 5 will be explained next. In FIG. 5, like parts as FIG. 1 are designated by like reference numbers.

On the side of original table 51 in the discharging side of the original by the discharge roller 18, an original guide member 90 is disposed. The original guide member 90 includes an original reversing surface 91 curved in a circular arc and opened toward the original table 51. The original guide member 90 is pivotally supported through a pivot 95 at the lower portion opposite to the disposed side of the original table 51, substantially in the same height as the upper surface of the original table 51 so as to allow pivotal movement of the original reversing surface 91 vertically relative to the original table 51.

In the condition where one side portion (lower side in FIG. 5) is substantially flush with the upper surface of the original table 51, the original reversing surface 91 reverses the upper and underside of the original discharged from the original table 51 by the discharge roller 18 and transfers it again on the original table 51.

Figure 6:
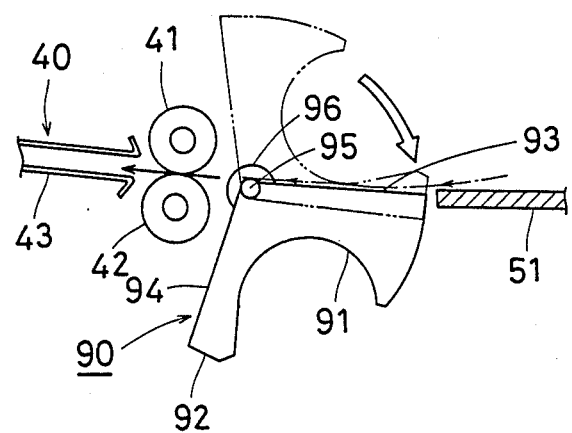
FIG. 6 is a view showing an essential portion of the unit of FIG. 5.

The original guide member 90 includes a positioning surface 92 disposed continually on one side (lower side in FIG. 5) of the original reversing surface 91 into which the original is introduced. The positioning surface 92 is disposed relative to the side portion in the original reversing surface 91 at an angle slightly less than 90°. The positioning surface 92 contacts to the front edge in the transferring direction of the original transferred by the discharge roller 18 in the condition where its upper portion is projected above the upper surface of the original table 51 as shown by two dots chain lines in FIGS. 5 and 6, to position the original in the prescribed position.

The original guide member 90 includes a flat surface 94 which extends continually from the positioning surface 92 to the disposed position of the pivot 95, and further includes a flat original forwarding surface 93 extending upward in FIG. 5 relative to the flat surface 94 at an angle little larger than 90°. The original forwarding surface 93 guides the original discharged from the original table 51 by the discharge roller 18 so as to be forwarded straight in the attitude positioned on the original table 51, when the whole original guide member 90 is pivoted clockwise (FIG. 5) about the pivot 95, and brought in the condition substantially parallel to the upper surface of the original table 51 as shown in full line in FIG. 6.

To the pivot 95, a pulse motor 96 which pivots the original guide member 90 vertically is connected. The pulse motor 96 can be switched into three stages comprising, a position where the lower side of the original reversing surface 91 is substantially flush with the upper surface of the original table 51 to function the original guide member 90 to reverse the upper and underside of the original discharged from the original table 51 by the discharge roller 18 and transferring it again to the original table 51, a position where the original reversing surface 91 is pivoted slightly above the functionable condition, and the positioning surface 92 is projected above the original table 51 to contact to the original transferred by the discharge roller 18 and positioning it at a prescribed position on the original table 51, and a position where the positioning surface 92 is pivoted downward by about 90° from the functionable condition, and the original forwarding surface 93 is in substantially parallel to the original table 51 to guide the original discharged from the original table 51 by the discharge roller 18 and forwarding it straight.

Figure 12:
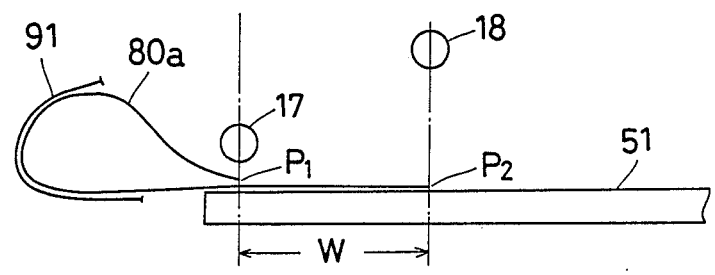
FIG. 12 is an explanatory view for explaining the construction of essential portion of the unit of FIG. 5.

In the case of this embodiment, as shown in FIG. 12, a distance (W) between points ($P_1$) and ($P_2$) where the feed roller 17 and discharge roller 18 contact to the original respectively is selected in such a manner that, at least the rear end of the original 80a having a minimum available copying size which passed through the original reversing surface 91 of the original guide member 90 is at the point ($P_2$) when its front end has arrived at the point ($P_1$), otherwise such original 80a can not be brought to the original table 51 after reversing.

Figure 7:
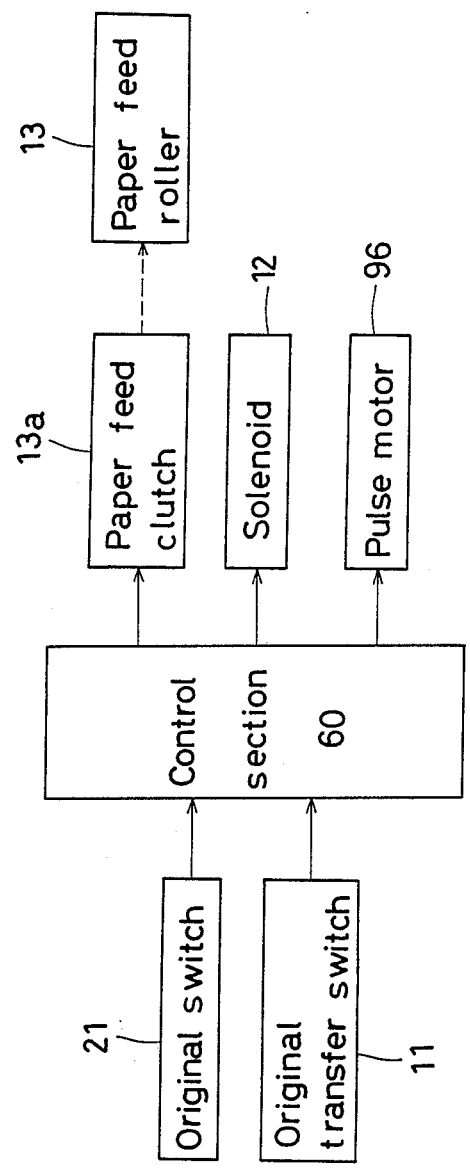
FIG. 7 is a block diagram of a control system of unit of FIG. 5.

FIG. 7 is a block diagram of a control system of the automatic original feeding and discharging unit of the present embodiment. It is different from FIG. 2 in that, instead of the solenoid 32 the pulse motor 96 is driven by the output from the control section 60.

Figure 8:
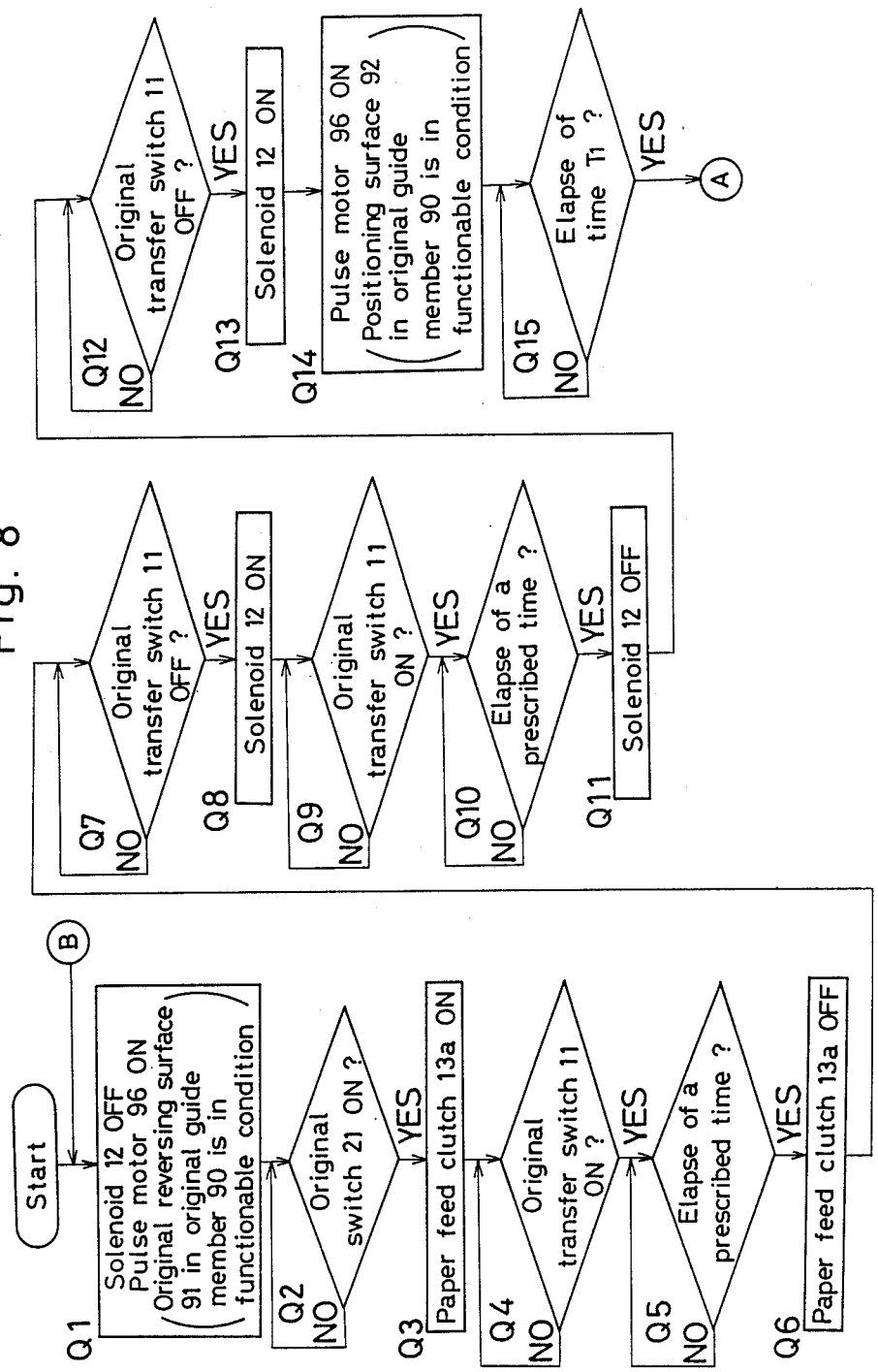
FIGS. 8 and 9 are flow charts showing the operation of the control system.
Figure 9:
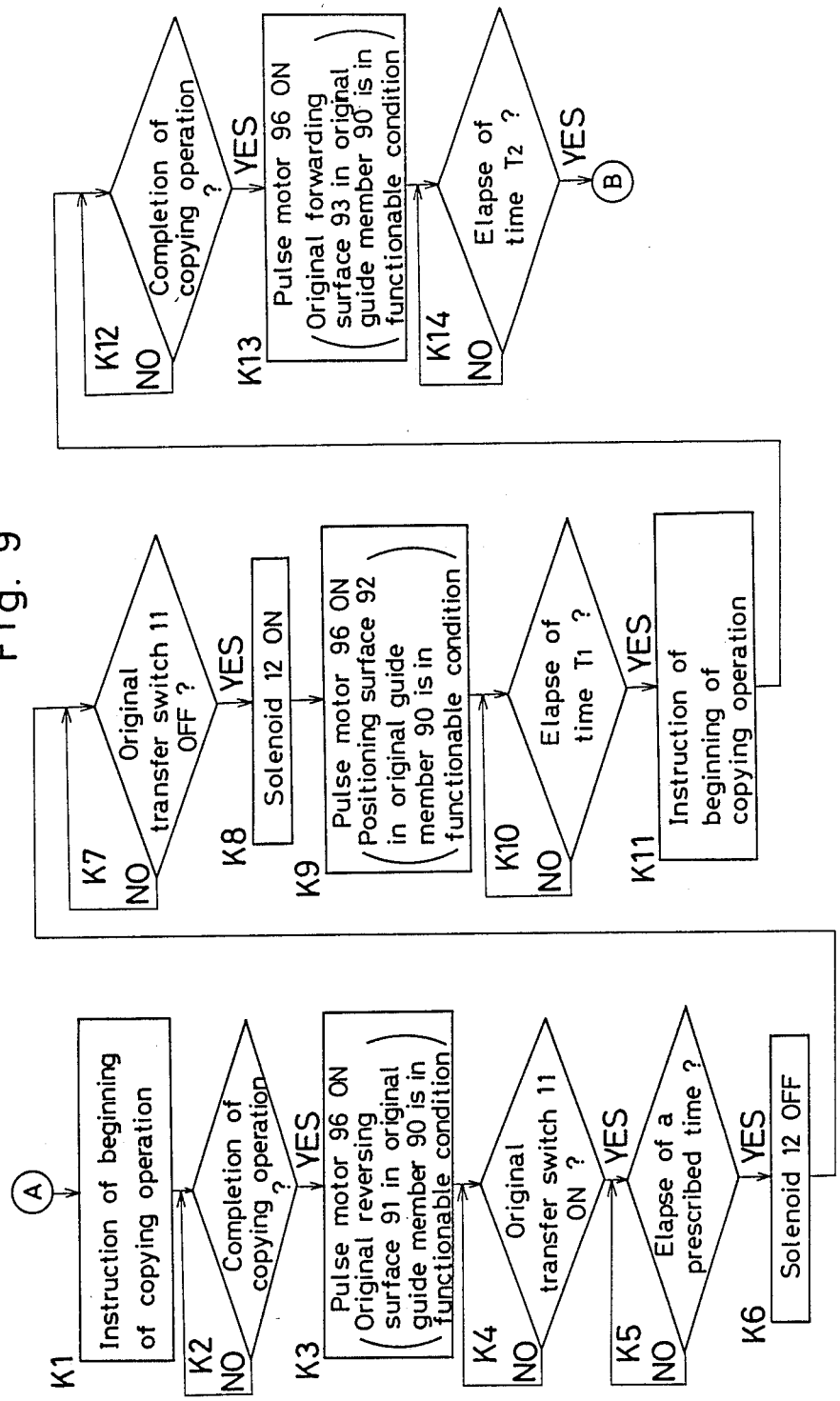

The operation of the automatic original feeding and discharging unit thus constructed will b explained briefly with reference to flow charts shown in FIGS. 8 and 9. First, the originals having original faces on both sides are placed on the original paper feed table 20 in order from the bottom. Consequently, on the original paper feed table 20, the originals are placed as such that the first page is facing downward at the bottom and the last page (page n) is facing upward at the top. When a switch which instructs the copying operation is actuated in such condition, the feed roller 17 and discharge roller 18 provided on the paper feed guide 10 are rotated and the solenoid 12 is OFF condition by the control section 60. At this time, the pulse motor 96 is driven to rotate the original guide member 90, the original is introduced into its original reversing surface 91 to be reversed and transferred to the original table 51 (refer to Step $Q_1$ of FIG. 8, the rest is same). Next, whether the original is placed on the original paper feed table 20 or not is checked by ON/OFF of the original switch 21 (Step Q2). The original switch 21 is in ON condition by the original placed on the original paper feed table 20 in advance, and the control section 60 brings the paper feed clutch 13a in ON condition to rotate the paper feed roller 13 (Step Q3). Thereby, only the top original (page n and page n−1) of the plurality of originals placed on the original paper feed table 20 passes between the paper feed roller 13 and the friction member 14, and guided along the guide 10b in the paper feed guide 10 as facing its last page (page n) upward. The original transferred along the guide 10b is contacted to the original transfer switch 11 disposed on the guide 10b to switch it on (Step Q4). After this original is transferred and a prescribed time at which the top original placed on the original paper feed table 20 is able to contact to the paper feed roller 13 has elapsed (Step Q5), the paper feed clutch 13a is switched off (Step Q6).

In this case, since the solenoid 12 disposed above the paper feed guide 10 is in OFF condition, the feed roller 17 is contacted to the upper surface of original table 51. The original fed on the original table 51 by the paper feed roller 13 is introduced between the feed roller 17 and the upper surface of original table 51 from its front end in the transferring direction, and transferred through the gap between the upper surface of original table 51 and support 10a in the paper feed guide 10 in the direction indicated by the arrow A in FIG. 5. Page n−1 of the original is opposed to the upper surface of the original table 51.

On the other hand, when the rear end in the transferring direction of the original fed by the feed roller 17 is detached from the original transfer switch 11, which is in OFF condition (Step Q7). Thereby, the control section 60 puts on the solenoid 12 and rotates the support lever 16 to move the discharge roller 18 downward (Step Q8). Thereby, the feed roller 17 is detached from the original and the discharge roller 18 is contacted to the original placed on the original table 51. The original is then moved in the direction indicated by the arrow B in FIG. 5 along the original table 51 counter to the transferring direction by the feed roller 17. At this time, the lower side of the original reversing surface 91 of the original guide member 90 is substantially flush with the upper surface of the original table 51 so as to function the original reversing surface 91, and the original transferred by the discharge roller 18 is introduced into the original reversing surface 91 of the original guide member 90 and transferred along the original reversing surface 91. Then, the original being reversed by the original reversing surface 91 is again transferred along the guide 10b in the paper feed guide 10. The reversed original having the last page (page n) facing downward is, at this time, contacted again to the original transfer switch 11 disposed on the guide 10b to switch it on (Step Q9). When a prescribed time at which the front end of original being transferred is located under the feed roller 17 has elapsed (Step Q10), the solenoid 12 disposed above the paper feed guide 10 is in OFF condition (Step Q11), and the feed roller 17 is contacted to the upper surface of original table 51. The original reversed with its last page (page n) facing downward is introduced into the gap between the upper surface of original table 51 and the support 10a in the paper feed guide 10 by the feed roller 17.

When the rear end of the original in the transferring direction is detached from the original transfer switch 11 in such condition, the original transfer switch 11 is in OFF condition (Step Q12), the solenoid 12 is put on and the support lever 16 is rotated to move the discharge roller 18 downward (Step Q13). At this time, simultaneously, the pulse motor 96 is driven and the original guide member 90 is rotated slightly upward to project the positioning surface 92 little above the upper surface of the original table 51 as shown by two dots chain lines in FIG. 6 (Step Q14).

When the solenoid 12 is put on and the support lever 16 is rotated, the original transferred on the original table 51 is contacted to the discharge roller 18 to be moved in the direction indicated by the arrow B in FIG. 5, and its front end in the transferring direction is, after a prescribed time $T_1$ has elapsed (Step Q15), contacted to the positioning surface 92 of the original guide member 90. With its last page (page n) contacting the original table 51, the original is pressed onto the positioning surface 92 by the discharge roller 18 and positioned in a prescribed attitude at a prescribed position on the original table 51. Though the discharge roller 18 is rotated thereafter, since a sponge roller having a relatively low friction coefficient is used and also a gap between the original table 51 and the support 10a in the paper feed guide 10 is about a sheet of original, even the original is pressed onto the positioning surface 92 in the original guide member 90 by the discharge roller 18, there is no possibility of the original being corrugated.

The control section 60 outputs the signal instructing the beginning of copying operation to a control section of the copying machine in such condition as shown in FIG. 9 (Step K1), and the copying machine starts the copying operation. The copying operation is same as the conventional electrophotographic copying process, so that its description will be omitted. When the copying operation by the copying machine is completed and a copy image on the last page (page n) of the original is formed (Step K2), the pulse motor 96 is driven and the original guide member 90 is rotated slightly downward to bring the original reversing surface 91 in the original guide member 90 to be substantially flush with the upper surface of the original table 51 as shown by the full line in FIG. 5 so as to become functionable. Thereby, the original on the original table 51 is moved in the direction indicated by the arrow B by the discharge roller 18, discharged from the original table 51 and introduced to the original reversing surface 91 of the original guide member 90. The original introduced to the original reversing surface 91 is transferred therealong and fed to the original table 51 along the guide 10b in the paper feed guide 10 as the last page (page n) facing upward and page n−1 facing downward. When the original transfer switch 11 is ON (Step K4) by the original and after a prescribed time at which the front end of original is located under the feed roller 17 (Step K5) has elapsed, the solenoid 12 is put off (Step K6) and the original is transferred onto the original table 51 by the feed roller 17. Thereafter, when the original transfer switch 11 is put OFF (Step K7), the solenoid 12 is ON (Step K8) and the pulse motor 96 is put on to bring the positioning surface 92 in the original guide member 90 in the functionable condition (Step K9). Thereby, the original with its page n−1 contacting the original table 51 is transferred in the discharging direction by the discharge roller 18 to contact to the positioning surface 92 at its front edge. The original is then positioned in a prescribed attitude at a prescribed position on the original table 51. After a prescribed time $T_1$ has elapsed (Step K10), the copying operation is performed by the copying machine (Step K11) and the copy image of page n−1 is formed as the original being contacted to the positioning surface 92 by the discharge roller 18.

When the prescribed copying operation is finished (Step K12), the pulse motor 96 is put on, the original guide member 90 is rotated downward to plunge entirely below the upper surface of the original table 51 in the functionable condition where the original forwarding surface 93 is substantially flush therewith (Step K13). In consequence, the original on the original table 51 is discharged herefrom by the discharge roller 18 as facing the page n−1 downward and forwarded straight as being guided by the original forwarding surface 93 of the original guide member 90. The original is then introduced into the original reversing path 43 in the reversing mechanism 40 by the inlet rollers 41 and 42, reversed by the original reversing path 43 and placed on the original tray 46 by the outlet rollers 44 and 45 with the last page (page n) on the underside and page n−1 on the upper side.

By repeating such operations successively, both original faces of the original on the original paper feed table 20 are copied from the large paged number and placed successively on the original tray 46. The originals piled on the original tray 46 are in order from the top opposite to the condition of the originals placed on the original paper feed table 20 in the beginning.

In this embodiment, though the original guide member 90 is constructed to include the original reversing surface 91 which reverses the original discharged from the original table 51 and transfers it back thereto, the positioning surface 92 which contacts the original for positioning, and the original forwarding surface 93 which guides the original discharged from the original table 51 to forward straight, it may be constructed to include the original reversing surface 91 and positioning surface 92, or to include the original reversing surface 91 and original forwarding surface 93.

Figure 10:
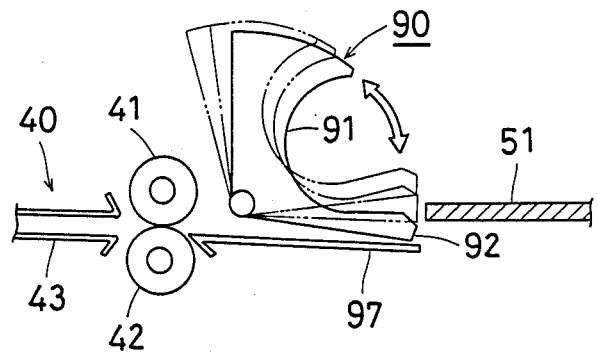
FIGS. 10 and 11 are views respectively showing an essential portion of the present embodiment in which the unit of FIG. 5 is partly modified.

As shown in FIG. 10, when the original guide member 90 comprises the original reversing surface 91 and positioning surface 92, a guide plate 97 for forwarding the original discharged from the original table 51 straight is provided under the original guide member 90. In this case, the original discharged from the original table 51 may be passed under the original guide member 90 by rotating it slightly above the functionable condition of the positioning surface 92. Thus, the rotating range of the original guide member 90 can be narrowed.

Figure 11:
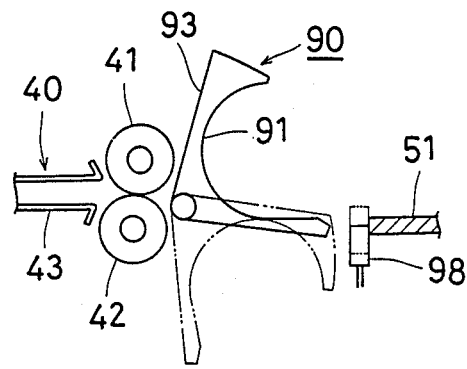

As shown in FIG. 11, when the original guide member 90 comprises the original reversing surface 91 and the original forwarding surface 93, a positioning member 98 is provided between the original table 51 and original guide member 90. In this case, since the original guide member 90 may be just switched to two positions, a solenoid is used to rotate the original guide member 90 without using a pulse motor.

In the embodiment of FIG. 5, though the case where the copy image of the original having original faces on both sides is formed has been described, this unit can also be used in the case when the original has only one original face.

In the aforesaid each embodiment, though the feed roller 17 is located on the original table and the discharge roller 18 is located thereabove in the initial state, that is, when the original is just about to be fed from the paper feed table 20, relative position of the rollers in the initial state may be reversed. That is, the discharge roller 18 may be located on the original table and the feed roller 17 may be located thereabove in the initial state. It is also possible to arrange in such that, in the initial state, the support lever 16 is held in parallel and both the feed roller 17 and discharge roller 18 are in the waiting position apart from the original table 51. In addition such waiting condition may also be made during the copying operation.

Though the feed roller 17 and discharge roller 18 rotate in the opposite directions, the both rollers may be driven simultaneously with one driving motor by driving either one through an intermediate gear.

While the present invention has been described in its preferred embodiment, it is to be understood that it is not limited to such embodiment and that various changes and modifications may be made without departing from the spirit and scope of the present invention.

What is claimed is:

1. An automatic original feeding and discharging unit comprising;
    a feed roller which contacts to an original fed on an original table of a copying machine and transfers said original in a prescribed direction,
    a discharge roller which contacts to the original on the original table and transfers said original in a direction counter to the transferring direction of said feed roller,
    a selecting mean which selectively contacts either said feed roller or discharge roller to the original on the original table,
    a positioning member which is possible to project from the upper surface of the original table so as to contact to the front edge in the transferring direction of the original transferred by said discharge roller, and possible to plunge in from the upper surface of the original table so as to enable the original transferred by said discharge roller to pass thereabove,
    a driving means which drives said positioning member to project and plunge from the original table, and
    a reversing means which reverses the upper and underside of the original passing above the positioning member and feeds it on the original table.

2. An automatic original feeding and discharging unit as claimed in claim 1, wherein said reversing means includes, an intermediate rollers for moving the original sent out from the original table, a paper refeed roller which outputs the reversed original, and a reversing path which reverses the original received from the intermediate rollers and gives it to the paper refeed roller.

3. An automatic original feeding and discharging unit as claimed in claim 2, wherein said reversing path is constituted by, an inlet port opposing the intermediate roller, an outlet port opposing the paper refeed roller and a transfer guide member which is possible to take a plurality of positions so as to select a course of the original introduced from the inlet port.

4. An automatic original feeding and discharging unit as claimed in claim 3 further comprising,
   means for setting said transfer guide member selectively in the position for guiding the original to the outlet port and in the position for guiding the original to an original discharge tray.

5. An automatic original feeding and discharging unit as claimed in claim 3 further comprising,
   means for setting said transfer guide member selectively in the position for guiding the original to the outlet port, in the position for guiding the original to the original discharge tray and in the position for guiding the original to a second reversing means led to the original discharge tray.

6. An automatic original feeding and discharging unit as claimed in claim 1 further comprising,
   a support lever having the feed roller and discharge roller mounted respectively on the both ends, supported rotatably at the center and controlled by the selecting means.

7. An automatic original feeding and discharging unit as claimed in claim 1, wherein one of the feed roller and discharge roller is always positioned on the original table.

8. An automatic original feeding and discharging unit as claimed in claim 7, wherein in the initial state, the feed roller is positioned on the original table and the discharge roller is brought to an inactive position.

9. An automatic original feeding and discharging unit as claimed in claim 7, wherein in the initial state, the discharge roller is positioned on the original table and the feed roller is brought to an inactive position.

10. An automatic original feeding and discharging unit as claimed in claim 1, wherein the feed roller and discharge roller are both set in neutral positions off the original table in the initial state.

11. An automatic original feeding and discharging unit as claimed in claim 1 further comprising,
    an original paper feed means including an original paper feed table and paper feed roller and disposed on the same side as the reversing means.

12. An automatic original feeding and discharging unit as claimed in claim 11, wherein the original paper feed section is disposed above the reversing means.

13. An automatic original feeding and discharging unit comprising;
    a feed roller which contacts to an original fed on an original table of a copying machine and transfers said original in a prescribed direction,
    a discharge roller which contacts to the original on the original table and transfers said original in a direction counter to the transferring direction of said feed roller,
    a selecting means which selectively contacts either said feed roller or discharge roller to the original on the original table,
    a positioning member which is possible to project from the upper surface of the original table so as to contact to the front edge in the transferring direction of the original transferred by said discharge roller, and possible to plunge in from the upper surface of the original table so as to enable the original transferred by said discharge roller to pass thereabove,
    a reversing means which receives the original discharged from the original table by the discharge roller, reversing it and discharging to the side of original table,
    a switching means disposed on the way through which the original discharged from the reversing means is guided to the original table, and
    a control means which contacts the feed roller to the original after a first prescribed time from the operation of said switch means by the front end of original.

14. An automatic original feeding and discharging unit as claimed in claim 13, wherein said reversing means includes, an intermediate rollers for moving the original sent out from the original table, a paper refeed roller which outputs the reversed original, and a reversing path which reverses the original received from the intermediate rollers and gives it to the paper refeed roller.

15. An automatic original feeding and discharging unit as claimed in claim 14, wherein said reversing path is constituted by, an inlet port opposing the intermediate roller, an outlet port opposing the paper refeed roller and a transfer guide member which is possible to take a plurality of positions so as to select a course of the original introduced from the inlet port.

16. An automatic original feeding and discharging unit as claimed in claim 15 further comprising,
    means for setting said transfer guide member selectively in the position for guiding the original to the outlet port and in the position for guiding the original to an original discharge tray.

17. An automatic original feeding and discharging unit as claimed in claim 15 further comprising,
    means for setting said transfer guide member selectively in the position for guiding the original to the outlet port, in the position for guiding the original to the original discharge tray and in the position for guiding the original to a second reversing means led to the original discharge tray.

18. An automatic original feeding and discharging unit as claimed in claim 13 further comprising,
    a support lever having the feed roller and discharge roller mounted respectively on both ends, supported rotatably at the center and controlled by the selecting means.

19. An automatic original feeding and discharging unit as claimed in claim 13, wherein one of the feed roller and discharge roller is always positioned on the original table.

20. An automatic original feeding and discharging unit as claimed in claim 19, wherein in the beginning the feed roller is positioned on the original table and the discharge roller is brought to an inactive position.

21. An automatic original feeding and discharging unit as claimed in claim 19, wherein in the beginning, the discharge roller is positioned o the original table and the feed roller is brought to an inactive position.

22. An automatic original feeding and discharging unit as claimed in claim 13, wherein the feed roller and discharge roller are both set in neutral position off the original table in the beginning.

23. An automatic original feeding and discharging unit as claimed in claim 13 further comprising,
   an original paper feed means including an original paper feed table and paper feed roller and disposed on the same side as the reversing means.

24. An automatic original feeding and discharging unit as claimed in claim 23, wherein the original paper feed section is disposed above the reversing means.

25. An automatic original feeding and discharging unit comprising;
   a feed roller which contacts to an original fed on an original table of a copying machine and transfers said original in a prescribed direction.
   a discharge roller which contacts to the original on the original table and transfers said original in a direction counter to the transferring direction of said feed roller.
   a selecting means which selectively contacts either said feed roller or discharge roller to the original on the original table,
   a positioning member which is possible to project from the upper surface of the original table so as to contact to the front edge in the transferring direction of the original transferred by said discharge roller, and possible to plunge in from the upper surface of the original table so as to enable the original transferred by said discharge roller to pass thereabove.
   a driving means which drives said positioning member to project and plunge from the original table,
   a reversing means which receives the original discharged from the original table by the discharge roller, reversing it and discharging to the side of original table,
   a switching means disposed on the way through which the original discharged from the reversing means is guided to the original table, and
   a control means which contacts the feed roller to the original after a first prescribed time from the operation of said switch means by the front end of original.

26. An automatic original feeding and discharging unit comprising;
   a feed roller which contacts to an original fed on an original table of a copying machine and transfers said original in a prescribed direction,
   a discharge roller which contacts to the original on the original table and transfers said original in a direction counter to the transferring direction of said feed roller,
   a selecting means which selectively contacts either said feed roller or discharge roller to the original on the original table,
   an original guide member disposed on the side of original table on the original discharging side of said discharge roller, and having a reversing surface which reverses the upper and underside of the original transferred by said discharge roller to guide it on the original table, and a positioning surface which is possible to contact to the front edge of the original transferred by said discharge roller, and
   a switching means which selectively switches said original guide member to bring either the original reversing surface or positioning surface in said original guide member functionable,
   distance between the contact points where the feed roller contacts to the original and the discharge roller contacts to the original is selected as such that, at least the rear end of the original is contacted to the discharge roller when the front end of original having a minimum available copying size passed through the original reversing surface of said original guide member is contacted to the feed roller.

27. An automatic original feeding and discharging unit comprising;
   a feed roller which contacts to an original fed on an original table of a copying machine and transfers said original in a prescribed direction,
   a discharge roller which contacts to the original on the original table and transfers said original in a direction counter to the transferring direction of said feed roller,
   a selecting means which selectively contacts either said feed roller or discharge roller to the original on the original table,
   an original guide member disposed on the side of original table on the original discharging side of said discharge roller, and having a reversing surface which reverses the upper and underside of the original transferred by said discharge roller to guide it on the original table, and a positioning surface which is possible to contact to the front edge of the original transferred by said discharge roller, and
   a switching means which selectively switches said original guide member to bring either the original reversing surface or positioning surface in said original guide member functionable 28. An automatic original feeding the discharging unit comprising;
   a feed roller which contacts to an original fed on an original table of a copying machine and transfers said original in a prescribed direction,
   a discharge roller which contacts to the original on the original table and transfers said original in a direction counter to the transferring direction of said feed roller,
   a selecting means which selectively contacts either said feed roller or discharge roller to the original on the original table,
   an original guide member disposed on the side of original table on the original discharging side of said discharge roller, and having a reversing surface which reverses the upper and underside of the original transferred by said discharge roller to guide it on the original table, and an original forwarding surface which guides the original discharged from the discharge roller to forward it straight, and
   a switching means which selectively switches said original guide member to bring the original reversing surface and original forwarding surface in said original guide member functionable,
   distance between the contact points where the feed roller contacts to the original and the discharge roller contacts to the original is selected as such that, at least the rear end of the original is contacted to the discharge roller when the front end of original having a minimum available copying size passed through said original guide member is contacted to the feed roller.

29. An automatic original feeding and discharging unit comprising;
- a feed roller which contacts to an original fed on an original table of a copying machine and transfers said original in a prescribed direction,
- a discharge roller which contacts to the original on the original table and transfers said original in a direction counter to the transferring direction of said feed roller,
- a selecting means which selectively contacts either said feed roller or discharge roller to the original on the original table,
- an original guide member disposed on the side of original table on the original discharging side of said discharge roller, and having an original reversing surface which reverses the upper and underside of the original transferred by said discharge roller to guide it on the original table, and an original forwarding surface which guides the original discharged from the discharge roller to forward it forward it straight, and
- a switching means which selectively switches said original guide member to bring the original reversing surface and original forwarding surface in said original guide member functionable.

30. An automatic original feeding and discharging unit comprising;
- a feed roller which contacts to an original fed on an original table of a copying machine and transfers said original in a prescribed direction,
- a discharge roller which contacts to the original on the original table and transfers said original in a direction counter to the transferring direction of said feed roller,
- a selecting means which selectively contacts either said feed roller or discharge roller to the original on the original table,
- an original guide member disposed on the side of original table on the original discharging side of said discharge roller, and having an original reversing surface which reverses the upper and underside of the original transferred by said discharge roller to guide it on the original table, a positioning surface which is possible to contact to the front edge of the original transferred by said discharge roller and an original forwarding surface which guides the original discharged from the discharge roller to forward it straight, and
- a switching means which selectively switches said original guide member to bring either the original reversing surface or positioning surface or original forwarding surface in said original guide member functionable,
- distance between the contact points where the feed roller contacts to the original and the discharge roller contacts to the original is selected as such that, at least the rear end of the original is contacted to the discharge roller when the front end of original having a minimum available copying size passed through said original guide member is contacted to the feed roller.

31. An automatic original feeding and discharging unit comprising;
- a feed roller which contacts to an original fed on an original table of a copying machine and transfers said original in a prescribed direction,
- a discharge roller which contacts to the original on the original table and transfers said original in a direction counter to the transferring direction of said feed roller,
- a selecting means which selectively contacts either said feed roller or discharge roller to the original on the original table,
- an original guide member disposed on the side of original table on the original discharging side of said discharge roller, and having an original reversing surface which reverses the upper and underside of the original transferred by said discharge roller to guide it on the original table, a positioning surface which is possible to contact to the front edge of the original transferred by said discharge roller, and an original forwarding surface which guides the original discharged from the discharge roller to forward it straight, and
- a switching means which selectively switches said original guide member to bring either the original reversing surface or positioning surface or original forwarding surface in said original guide member functionable.

* * * * *

UNITED STATES PATENT AND TRADEMARK OFFICE
CERTIFICATE OF CORRECTION

PATENT NO. : 4,836,525

DATED : June 6, 1989

INVENTOR(S) : Masayuki Mizuno

It is certified that error appears in the above-identified patent and that said Letters Patent is hereby corrected as shown below:

IN THE CLAIMS:

Col. 17, line 1, "o" should be --on--;

Col. 19, lines 23 and 24 which read "charged from the discharge roller to forward it forward it straight, and" should read --charged from the discharge roller to forward it straight, and--.

Signed and Sealed this

Twenty-fourth Day of April, 1990

Attest:

HARRY F. MANBECK, JR.

*Attesting Officer*  *Commissioner of Patents and Trademarks*